US012725834B2

(12) United States Patent
Liang et al.

(10) Patent No.: US 12,725,834 B2
(45) Date of Patent: Sep. 1, 2026

(54) HIGH-CONCENTRATION HIGH-ENTROPY ELECTROLYTE, METHOD FOR PREPARING THE SAME, AND BATTERY

(71) Applicant: KUNMING UNIVERSITY OF SCIENCE AND TECHNOLOGY, Kunming (CN)

(72) Inventors: Feng Liang, Kunming (CN); Xiecheng Yang, Kunming (CN); Yingjie Zhou, Kunming (CN); Da Zhang, Kunming (CN); Bin Yang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 34 days.

(21) Appl. No.: 18/400,980

(22) Filed: Dec. 29, 2023

(65) Prior Publication Data

US 2025/0079522 A1 Mar. 6, 2025

Related U.S. Application Data

(63) Continuation of application No. PCT/CN2023/117000, filed on Sep. 5, 2023.

(51) Int. Cl.
*H01M 10/0568* (2010.01)
*H01M 4/38* (2006.01)
(Continued)

(52) U.S. Cl.
CPC ....... *H01M 10/0568* (2013.01); *H01M 4/381* (2013.01); *H01M 10/0565* (2013.01);
(Continued)

(58) Field of Classification Search
CPC ......... H01M 10/0565; H01M 10/0568; H01M 10/0569; H01M 4/381; H01M 2004/027; H01M 2300/0028; H01M 2300/0071
See application file for complete search history.

(56) References Cited

U.S. PATENT DOCUMENTS

2014/0295238 A1* 10/2014 Chae .................... H01M 4/667 429/105
2019/0123390 A1* 4/2019 Xu ........................ H01M 4/382
(Continued)

FOREIGN PATENT DOCUMENTS

CN 111082161 A 4/2020
CN 111900495 A 11/2020
JP 2016-076463 A * 5/2016 .......... H01M 10/054

*Primary Examiner* — Osei K Amponsah

(74) *Attorney, Agent, or Firm* — HOWARD M. COHN and Associates, LLC

(57) ABSTRACT

A high-concentration high-entropy electrolyte and its preparation method and battery were disclosing in the present disclosure. A high-concentration high-entropy electrolyte, including a solvent, a first solute salt and added salts, the first solute salt is a solute salt with high solubility in the solvent, while the added salts are composed of at least three solute salts, the molar concentration range of the solute salts in the high-concentration high-entropy electrolyte is between 20 M-60 M, the molar concentration of the first solute salt is greater than 20 M, and the molar concentration of the first solute salt is greater than 50% of the molar concentration of the high-concentration high-entropy electrolyte. The sodium-carbon dioxide batteries assembled with high-concentration high-entropy electrolytes not only have higher power density, but also have excellent discharge specific capacity and rate performance.

4 Claims, 4 Drawing Sheets

| A | | B | C | |
|---|---|---|---|---|
| A1 | A2 | B | C1 | C2 |
| Metal sodium anode | Anode electrolyte | Solid electrolyte separator | Cathode electrolyte | Catalytic layer |

(51) Int. Cl.
*H01M 10/0565* (2010.01)
*H01M 10/0569* (2010.01)
*H01M 4/02* (2006.01)

(52) U.S. Cl.
CPC .. *H01M 10/0569* (2013.01); *H01M 2004/027* (2013.01); *H01M 2300/0028* (2013.01); *H01M 2300/0071* (2013.01)

(56) References Cited

U.S. PATENT DOCUMENTS

2019/0221879 A1* 7/2019 Safanama ............. H01M 8/188
2021/0257675 A1* 8/2021 Kang ................... C01G 23/002

* cited by examiner

| A | | | C | |
|---|---|---|---|---|
| A1 | A2 | B | C1 | C2 |
| Metal sodium anode | Anode electrolyte | Solid electrolyte separator | Cathode electrolyte | Catalytic layer |

HIGH-CONCENTRATION HIGH-ENTROPY ELECTROLYTE, METHOD FOR PREPARING THE SAME, AND BATTERY

CROSS-REFERENCE TO RELATED APPLICATIONS

The application is a continuation of International Application No. PCT/CN2023/117000 filed on Sep. 5, 2023.

TECHNICAL FIELD

The present disclosure relates to design and manufacture of a high-concentration high-entropy electrolyte and a battery. Specifically, the present disclosure relates to a high-concentration high-entropy electrolyte and a preparation method for preparing the high-concentration high-entropy electrolyte and a battery.

BACKGROUND

Global warming leads to an increase in the frequency and intensity of extreme weather and climate events, resulting in serious meteorological disasters. Among them, the use of fossil fuels leads to a large amount of carbon dioxide emissions, which is the main reason of the greenhouse effect. Therefore, reducing carbon dioxide emissions and converting them into valuable chemicals is an inevitable trend in today's social development.

A metal-carbon dioxide battery equipped with advanced carbon dioxide electrodes provide a promising strategy for recovery, utilization, and electrochemical energy conversion and storage of carbon dioxide. Among them, sodium-carbon dioxide batteries have received widespread attention due to their abundant sodium resources and high energy density (1125 $Wh/kg^1$). Therefore, conducting research on application of sodium-carbon dioxide batteries is of great significance for solving energy crisis and mitigating greenhouse effects.

However, poor physical and chemical properties of the electrolyte seriously hinder practical application of sodium-carbon dioxide batteries. Firstly, existing electrolytes have low ion conductivity and high viscosity, which cannot meet requirements for rapid transport of sodium ion during battery charging and discharging processes; Secondly, the low electrochemical stability window of the electrolyte leads to a low operating voltage of the battery, ultimately resulting in a low energy density of the battery; Thirdly, when using existing electrolytes, the discharge products of the battery are all solid products, namely one of sodium carbonate, sodium oxalate, or sodium bicarbonate. When the battery operates for a long time, the solid discharge products will block the catalytic layer and cause battery failure. Therefore, studying new electrolytes to improve electrochemical performance of sodium-carbon dioxide and promote the application of sodium-carbon dioxide batteries is of great significance.

SUMMARY

The present disclosure provides a high-performance, high concentration, high entropy electrolyte and a preparation method for preparing the high-performance, high concentration, high entropy electrolyte. Based on different sodium salt components and ratios, the most suitable sodium salt composition and concentration are optimized, and an electrolyte with high ion conductivity, low viscosity, high stability, and high chaos is successfully prepared. The present disclosure also provides a sodium-carbon dioxide battery based on the high-concentration high-entropy electrolyte, and improves electrochemical performance of the battery such as rate, capacity, power density, and cycling by using the electrolyte. The present disclosure provides a high-concentration high-entropy electrolyte, which increases the concentration of solute salts in the electrolyte by introducing multi-solute salts (both inorganic and organic salts), and further enhances the degree of disorder of salt anions or cations in the electrolyte. The high-concentration high-entropy electrolyte, includes a solvent, a first solute salt and added salts, the first solute salt is a solute salt with high solubility in the solvent, while the added salts are composed of at least three solute salts, the molar concentration range of the solute salts in the high-concentration high-entropy electrolyte is between 20 M-60 M, the molar concentration of the first solute salt is greater than 20 M, and the molar concentration of the first solute salt is greater than 50% of the molar concentration of the high-concentration high-entropy electrolyte.

Furthermore, the molar concentrations of the added salts are less than 50% of the molar concentration of the high-concentration high-entropy electrolyte, and the proportion of the added salts is calculated based on the solubility of the solute salt in the solvent.

Furthermore, the solvent is an organic solvent or an inorganic solvent; the organic solvent is at least one of aromatic hydrocarbon, aliphatic hydrocarbons, alicyclic hydrocarbons, halogenated hydrocarbons, alcohols, ethers, esters, ketones, diol derivatives, as well as acetonitrile, pyridine and phenol; the inorganic solvent is at least one of acidic solvent, alkaline solvent, amphoteric solvent or inert solvent.

Furthermore, the solute salts include organic salts or inorganic salts. Among them, the solute salts include Lithium trifluoromethanesulfonate (LiOTF), Sodium trifluoromethanesulfonate (NaOTF), Magnesium bis(trifluoromethanesulfonyl)imide ($Mg(TFSI)_2$), Sodium bis(trifluoromethanesulfonyl)imide (NaTFSI), Lithium bis(trifluoromethanesulfonyl)imide (LiTFSI), Lithium nitrate ($LiNO_3$), Sodium nitrate ($NaNO_3$), Sodium bis(fluorosulfonyl)imide (NaFSI), Lithium bis(fluorosulfonyl)imide (LiFSI), Sodium perchlorate ($NaClO_4$), Lithium perchlorate ($LiClO_4$), Sodium chloride (NaCl), Lithium chloride (LiCl), Zinc chloride ($ZnCl_2$), Sodium iodide (NaI) and other salts. The solvent is water (distilled water or deionized water).

The present disclosure further provides a preparation method for preparing a high-concentration high-entropy electrolyte, including the following steps:

S1. Selecting a solute salt with high solubility as the first solute salt, calculating a mass of the first solute salt based on a preset molar concentration and weighing the mass of the first solute salt, and dissolving the first solute salt in a solvent, heating to obtain a basic high concentration electrolyte;

S2. Selecting three or more solute salts as added salts, calculating a mass of the added salts and weighing the added salts based on the mass of the added salts, dissolving the added salts in the basic high concentration electrolyte, heating to have the added salts completely dissolved to obtain a mixed high concentration electrolyte;

S3. Sonicating the mixed high concentration electrolyte in an ultrasonic instrument to ensure that all components in the mixed high concentration electrolyte are completely mixed, cooling to room temperature to obtain the high-concentration high-entropy electrolyte.

Furthermore, the molar concentration range of the solute salts in the high-concentration high-entropy electrolyte is 20 M-60 M; the molar concentration of the first solute salt is greater than 20 M; the molar concentration of the first solute salt is greater than 50% of the total molar concentration of the high-concentration high-entropy electrolyte; and the sum of the molar concentrations of the added salt is less than 50% of the total molar concentration of the high-concentration high-entropy electrolyte.

On the other hand, the present disclosure also provides a sodium-carbon dioxide battery including a high-concentration high-entropy electrolyte, which replaces traditional cathode electrolytes (saturated sodium chloride solution, "salt-in-water" electrolyte, seawater electrolyte, etc.) to obtain a sodium-carbon dioxide battery based on a high-concentration high-entropy electrolyte.

Compared with prior art, the present disclosure provides a sodium-carbon dioxide battery based on a high-concentration high-entropy electrolyte. The high-concentration high-entropy electrolyte includes a base electrolyte with a high concentration and added salts. This electrolyte has higher ion conductivity, lower viscosity, higher stability, and higher degree of disorder than traditional electrolytes. In addition, it further has higher carbon dioxide solubility and weaker solvation ability. The use of the high-concentration high-entropy electrolyte can not only effectively improve the power density and discharge specific capacity of sodium-carbon dioxide batteries, but also improve the poor rate performance of batteries based on traditional electrolytes. Meanwhile, the use of this electrolyte can also convert the solid discharge products of sodium-carbon dioxide batteries based on traditional electrolytes into liquid discharge products, which is beneficial for improving the cycling stability of the battery and improving the utilization rate of the metal sodium anode. In addition, this electrolyte can effectively reduce the corrosion of the electrolyte on the electrode, thereby improving the performance of the battery, which is of great significance for the commercialization of sodium-carbon dioxide batteries.

DETAILED DESCRIPTION OF THE EMBODIMENTS

The following will provide a clear and complete description of technical solutions in the embodiments of the present disclosure, in conjunction with accompanying drawings. Obviously, described embodiments are only a part of the embodiments of the present disclosure, not all of them. Based on the embodiments in the present disclosure, all other embodiments obtained by ordinary person skilled in the art without creative labor fall within the scope of protection of present application.

Figures 1, 2:
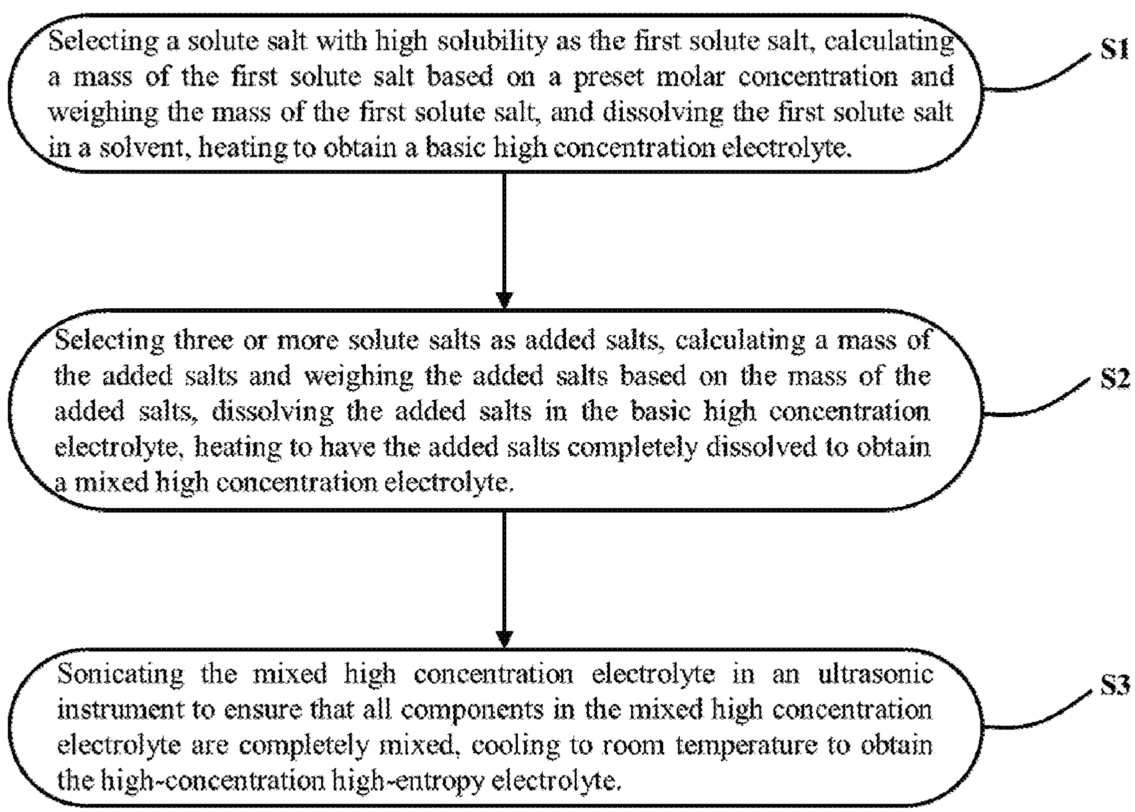
FIG. 1 is a schematic diagram of a flow chart of a method for preparing a high-concentration high-entropy electrolyte provided according to an embodiment of the present disclosure.
FIG. 2 is a structural diagram of a sodium-carbon dioxide battery according to an embodiment of the present disclosure.

Please refer to FIG. 1, which is a flowchart of a preparation method for preparing a high-concentration high-entropy electrolyte according to an embodiment of the present disclosure. The preparation method includes following steps:

S1. Select a solute salt with high solubility as a first solute salt, weigh a certain amount of the first solute salt and dissolve it in a solvent to obtain an electrolyte having a certain molar concentration. Heat it to 60° C. to obtain a basic high concentration electrolyte.

S2. Select three or more solute salts as added salts, calculate and weigh the added salts based on a preset molar concentration, add it to the basic high concentration electrolyte obtained in step S1, and heat it to 60° C. to have all solute salts completely dissolved, so as to obtain a mixed high concentration electrolyte.

S3. Put the mixed high concentration electrolyte obtained from S2 into an ultrasonic instrument and sonicate for 5-30 minutes to ensure that all components in the mixed high concentration electrolyte are completely mixed. Cool the mixed high concentration electrolyte after complete mixing to room temperature to obtain a high-concentration high-entropy electrolyte.

It can be understood that high solubility refers to the mass (solid and liquid) or volume of solute dissolved after reaching saturation. In this embodiment, it refers to the mass of solute dissolved after the solute salt reaches saturation in the solvent.

Among them, in the high-concentration high-entropy electrolyte prepared according to the preparation method, the molar concentration range of the solute salt is 20 M-60 M, the molar concentration of the first solute salt exceeds 20 M, and the molar concentration of the first solute salt accounts for more than 50% of the total molar concentration of the high-concentration high-entropy electrolyte; The sum of the molar concentrations of the added salts is less than 50% of the total molar concentration of the high-concentration high-entropy electrolyte.

Specifically, the molar concentrations of the solute salts can be 20 M, 25 M, 30 M, 35 M, 40 M, 45 M, 50 M, 55 M, 60 M, as long as they are within the range of 20 M-60 M. The molar concentration of the first solute salt is greater than 20 M, which means that the molar concentration of the first solute salt can be 20 M, 25 M, 30 M, 35 M, 40 M, 45 M, 50 M, 55 M, 60 M, etc.; If the molar concentration of the high-concentration high-entropy electrolyte is 50 M, the molar concentration of the first solute salt is not less than 25 M. If the molar concentration of the high-concentration high-entropy electrolyte is 60 M, the molar concentration of the first solute salt is not less than 30 M, that is, the molar concentration of the first solute salt accounts is not less than 50% of the total molar concentration of the high-concentration high-entropy electrolyte; It can be understood that when the molar concentration of the first solute salt accounts for more than 50% of the total molar concentration of the high-concentration high-entropy electrolyte, the sum of the molar concentrations of the added salts is less than 50% of the total molar concentration of the high-concentration high-entropy electrolyte. That is, when the molar concentration of the high-concentration high-entropy electrolyte is 50 M, the molar concentration of the first solute salt is at least 25 M, and the sum of the molar concentrations of the added salt is less than 25 M.

In steps S1 and S2, a mass of the first solute salt and the added salts to be added are calculated based on a preset concentration of the high-concentration high-entropy electrolyte and the concentration of the first solute salt. Then, the first solute salt and the added salts with calculated mass are weighed and the basic high concentration electrolyte and the mixed high concentration electrolyte having corresponding molar concentration are prepared in steps S1 and S2 respectively.

In this embodiment, the solute salts may include organic or inorganic salts. The solute salts include Lithium trifluoromethanesulfonate (LiOTF), Sodium trifluoromethanesulfonate (NaOTF), Magnesium bis(trifluoromethanesulfonyl)imide ($Mg(TFSI)_2$), Sodium bis (trifluoromethanesulfonyl)imide (NaTFSI), Lithium bis (trifluoromethanesulfonyl)imide (LiTFSI), Lithium nitrate ($LiNO_3$), Sodium nitrate ($NaNO_3$), Sodium bis(fluorosulfonyl)imide (NaFSI), Lithium bis(fluorosulfonyl)imide (LiFSI), Sodium perchlorate ($NaClO_4$), Lithium perchlorate ($LiClO_4$), Sodium chloride (NaCl), Lithium chloride (LiCl), Zinc chloride ($ZnCl_2$), Sodium iodide (NaI), etc. Specifically, the first solute salt is one of Sodium bis(fluorosulfonyl)imide (NaFSI), Lithium bis(fluorosulfonyl)imide (LiFSI), Lithium bis(trifluoromethanesulfonyl)imide (LiTFSI), and Zinc chloride ($ZnCl_2$). The added salts are at least three of Lithium nitrate ($LiNO_3$), Sodium nitrate ($NaNO_3$), Sodium perchlorate ($NaClO_4$), lithium perchlorate ($LiClO_4$), Sodium chloride (NaCl), Lithium chloride (LiCl), and Sodium iodide (NaI). It can be understood that the added salts can be three of the aforementioned solute salts, as well as four, five, six, or even more.

The solvent described in the embodiments of the present disclosure can be an organic solvent, selected from at least one of aromatic hydrocarbons, aliphatic hydrocarbons, alicyclic hydrocarbons, halogenated hydrocarbons, alcohols, ethers, esters, ketones, diol derivatives, as well as acetonitrile, pyridine, phenol, etc.; It can also be an inorganic solvent, selected from at least one of acidic solvents, alkaline solvents, zwitterionic solvents, or inert solvents. In this embodiment, the solvent is water and/or deionized water.

In some embodiments, selecting a salt with high solubility in water as the first solute salt, such as NaFSI, LiFSI, LiTFSI, $ZnCl_2$, etc., and then selecting three or more salts as the added salts, and dissolving them in deionized water at a certain molar concentration to obtain a high-concentration high-entropy electrolyte. The added salts can be $LiNO_3$, $NaNO_3$, $NaClO_4$, $LiClO_4$, NaCl, LiCl, NaI or other solute salts. The high-concentration high-entropy electrolyte obtained by using multiple salts has lower viscosity, higher ion conductivity, wider electrochemical stability window and stability than traditional electrolytes. In addition, the high-concentration high-entropy electrolyte also has higher carbon dioxide solubility than traditional electrolytes. Most importantly, the high-concentration high-entropy electrolyte has lower solvation effect than traditional electrolytes.

The high-concentration high-entropy electrolyte prepared by the preparation method described in the embodiments of the present disclosure has high ion conductivity, low viscosity, high stability, and high disorder; At the same time, it also has a high ability to dissolve carbon dioxide and weak solvation effect.

On the other hand, embodiments of the present disclosure also provide a sodium-carbon dioxide battery including the aforementioned high-concentration high-entropy electrolyte. As shown in FIG. 2, FIG. 2 is a schematic diagram of the structure of a sodium-carbon dioxide battery provided in an embodiment of the present disclosure. The sodium-carbon dioxide battery incudes an anode A, a solid electrolyte separator B, and a cathode C. The anode A includes a metal sodium anode A1 and an anode electrolyte A2, and the cathode C includes a cathode electrolyte C1 and a catalytic layer C2. In the embodiment of the present disclosure, the metal sodium anode A1, the anode electrolyte A2, the solid electrolyte separator B, and the catalytic layer C2 are the same as those of the sodium-carbon dioxide battery with the traditional electrolyte. The cathode electrolyte C1 is different from the sodium-carbon dioxide battery with the traditional electrolyte, and the cathode electrolyte C1 is a high-concentration high-entropy electrolyte prepared by the preparation method described in the embodiment of the present disclosure.

Specifically, the metal sodium anode A1 is a metal sodium sheet with a purity exceeding 99.7%, a thickness of 1 mm, and a diameter of 10 mm. The anode electrolyte A2 is an ester electrolyte of 1 M $NaClO_4$/[(EC+DMC) (1:1)+1 vol % FEC], where 1:1 is the volume ratio. The solid electrolyte separator B is a NASICON structured fast ion conductor of $Na_3Zr_2Si_2PO_2$, with a thickness of 10 mm and a diameter of 16 mm. The catalyst layer C2 is made by pressing carbon paper loaded with catalyst and foam nickel. The carbon paper loaded with catalyst has a diameter of 10 mm and a thickness of 0.5 mm. The carbon paper loaded with catalyst is prepared by coating the slurry formed by dispersing the catalyst in a mixed solution on the hydrophilic carbon paper, wherein the catalyst is 5% Ru/C catalyst, and the mixed solution is obtained by mixing alcohol, water, and a binder with a volume ratio of 8:1.5:0.5, wherein the binder is a 5% Poly(vinylidene fluoride) (PVDF) aqueous solution. The thickness of the foam nickel is 1 mm and the diameter are 10 mm.

In some embodiments, in the cathode electrolyte C1 of a sodium-carbon dioxide battery, when a high-concentration high-entropy electrolyte is used instead of a traditional electrolyte, the lower viscosity of the high-concentration high-entropy electrolyte can significantly improve the power density of the battery. The higher ion conductivity and lower solvation effect are conducive to improving the rate performance of the battery, and a wider electrochemical stability window and stability are conducive to improving the cycling performance of the battery. A higher ability to dissolve carbon dioxide is beneficial for improving the discharge specific capacity of batteries. In addition, the unique solvation structure of high-concentration high-entropy electrolytes can selectively generate liquid product formic acid. The generation of liquid product is not easy to block the catalytic active sites of the catalytic layer, allowing the battery to perform long-term discharge work, thereby improving the utilization rate of the anode.

Embodiment 1

Figure 3:
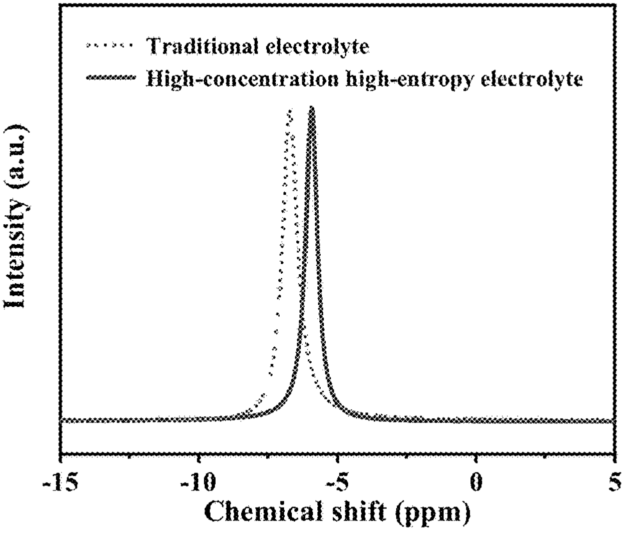
FIG. 3 shows the sodium nuclear magnetic resonance spectra of the high-concentration high-entropy electrolyte provided by an embodiment of the present disclosure and a traditional electrolyte.

As shown in FIG. 3, the sodium nuclear magnetic resonance spectra of a high-concentration high-entropy electrolyte prepared according to the aforementioned preparation method and a traditional electrolyte are shown. Among them, the high-concentration high-entropy electrolyte is prepared by dissolving four solute salts including NaFSI with a molar concentration of 20 M, $NaClO_4$ with a molar concentration of 5 M, NaCl with a molar concentration of 5 M, and $NaNO_3$ with a molar concentration of 5 M in deionized water. The traditional electrolyte is obtained by dissolving NaFSI with a molar concentration of 35 M in deionized water. The results of nuclear magnetic resonance (NMR) treatment of the aforementioned two electrolytes showed that in the NMR sodium spectrum, the chemical shift of the sodium ion characteristic peak in the high-concentration high-entropy electrolyte gradually shifted towards a lower field compared to the traditional electrolyte, indicating a decrease in the solvation effect around the sodium ions. This is conducive to removal of sodium ions during the battery's operation and is more conducive to achieving rapid transfer of sodium ions. In this embodiment, two types of sodium-carbon dioxide batteries are provided for comparative experiments. The two types of sodium-carbon dioxide batteries, from anode section A to cathode section C, sequentially include metal sodium anode A1, anode electrolyte A2, solid electrolyte separator B, cathode electrolyte C1, and catalytic layer C2. Among them, the metal anode A1 is a metal sodium sheet, with a thickness of 1 mm and a diameter of 10 mm. The anode electrolyte A2 is 1 M $NaClO_4$/[(EC+DMC) (1:1)+1 vol % FEC]; The solid electrolyte diaphragm B is a NASICON type fast ion conductor, with a thickness of 1 mm and a diameter of 16 mm; The cathode electrolyte of one of the sodium-carbon dioxide batteries is the high-concentration high-entropy electrolyte mentioned in this embodiment, which is prepared by dissolving four solute salts, 20 M NaFSI, 5 M $NaClO_4$, 5 M NaCl, and 5 M $NaNO_3$, in deionized water; The cathode electrolyte of another sodium-carbon dioxide battery is the traditional electrolyte mentioned in this embodiment, which is obtained by dissolving 35 M NaFSI in deionized water; The catalyst layer is pressed from carbon paper loaded with catalyst and foam nickel. The carbon paper loaded with catalyst is porous hydrophilic carbon paper with a diameter of 10 mm and a thickness of 0.5 mm. The catalyst is 5% Ru/C. The foam nickel has a thickness of 1 mm and a diameter of 10 mm.

Figure 4:
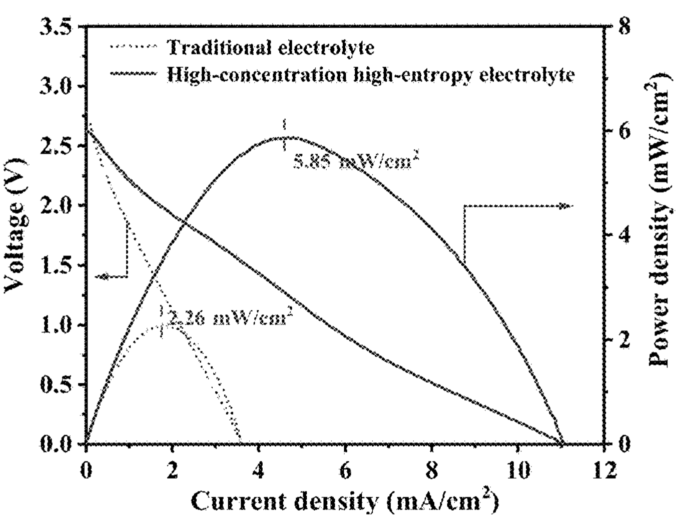
FIG. 4 is a power density curve of a sodium-carbon dioxide battery based on the high-concentration high-entropy electrolyte provided by an embodiment of the present disclosure and a traditional electrolyte.
Figure 5:
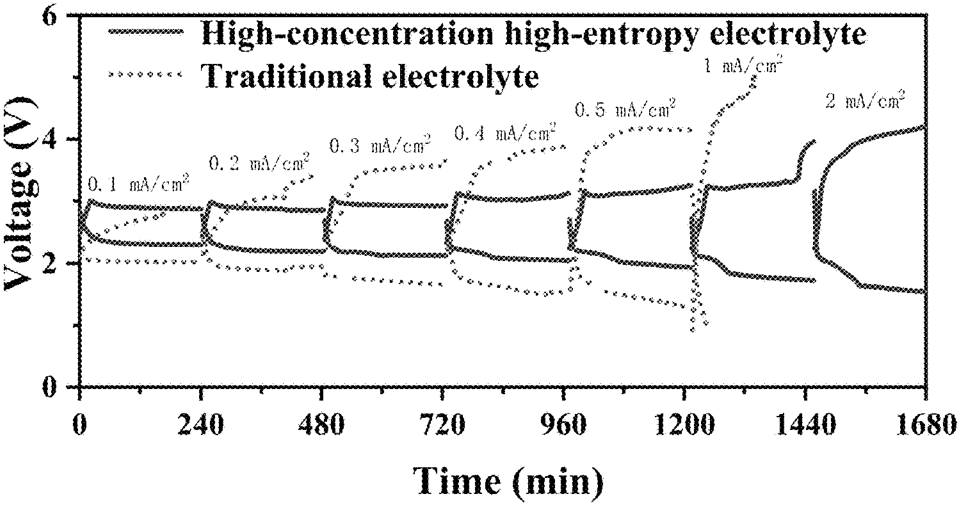
FIG. 5 is a rate curve of a sodium-carbon dioxide battery based on the high-concentration high-entropy electrolyte provided by an embodiment of the present disclosure and a traditional electrolyte.

The two types of sodium-carbon dioxide batteries assembled in this embodiment were subjected to performance testing under constant temperature of 30° C. and pure carbon dioxide conditions. The power density curve is shown in FIG. 4, and the rate curve is shown in FIG. 5. When the cathode electrolyte is the high-concentration high-entropy electrolyte, the maximum power density of the sodium-carbon dioxide battery is 5.85 $mW/cm^2$; When the cathode electrolyte is the traditional electrolyte, the maximum power density of the sodium-carbon dioxide battery is 2.26 $mW/cm^2$. From FIG. 5, it can be seen that when the cathode electrolyte is the high-concentration high-entropy electrolyte, the rate performance of the sodium-carbon dioxide battery is significantly better than when the cathode electrolyte is a traditional electrolyte; In addition, when the current density increases to 2 $mA/cm^2$, the sodium-carbon dioxide battery using the traditional electrolyte can no longer function properly, while the sodium-carbon dioxide battery using the high-concentration high-entropy electrolyte still have excellent charging and discharging performance. It can be seen that the performance of the sodium-carbon dioxide battery using the high-concentration high-entropy electrolyte as the cathode electrolyte in this embodiment is better than that of the sodium-carbon dioxide battery using the traditional electrolyte as the cathode electrolyte.

Embodiment 2

In this embodiment, two sodium-carbon dioxide batteries are provided for comparative experiments. The two types of sodium-carbon dioxide batteries, from anode section A to cathode section C, sequentially include a metal sodium anode A1, an anode electrolyte A2, a solid electrolyte separator B, a cathode electrolyte C1, and a catalytic layer C2. Among them, the metal anode A1 is a metal sodium sheet, with a thickness of 1 mm and a diameter of 10 mm; The anode electrolyte A2 is 1 M $NaClO_4$/[(EC+DMC) (1:1)+1 vol % FEC]; The solid electrolyte diaphragm B is a NASICON type fast ion conductor, with a thickness of 1 mm and a diameter of 16 mm; The cathode electrolyte of one of the two sodium-carbon dioxide batteries is a high-concentration high-entropy electrolyte. The high-concentration high-entropy electrolyte is prepared by dissolving 5 solute salts including 27 M NaFSI, 2 M $NaClO_4$, 2 M NaCl, 2 M $NaNO_3$, and 2 M NaI in deionized water according to the above preparation method. The cathode electrolyte of another of the two sodium-carbon dioxide batteries is a traditional electrolyte, the traditional electrolyte is prepared by dissolving 18 M $NaClO_4$ in deionized water according to the above preparation method; The catalyst layer is pressed from a carbon paper loaded with catalyst and foam nickel. The carbon paper loaded with catalyst is porous hydrophilic carbon paper with a diameter of 10 mm and a thickness of 0.5 mm. The catalyst is 5% Ru/C. The foam nickel has a thickness of 1 mm and a diameter of 10 mm.

Figure 6:
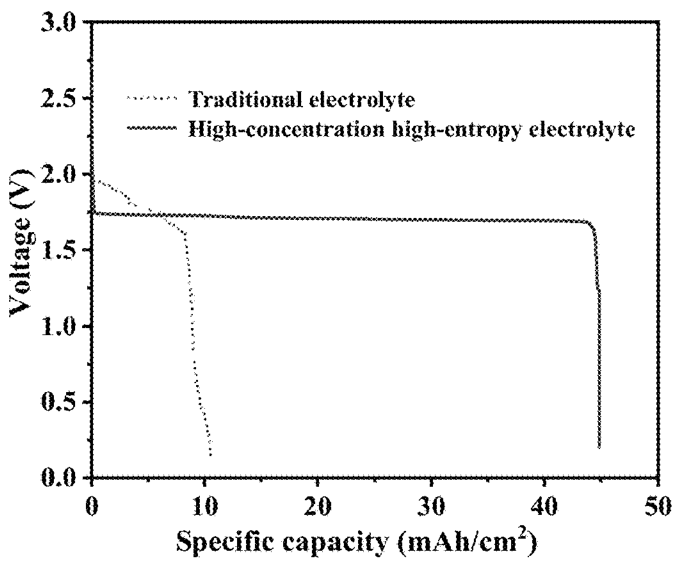
FIG. 6 is a discharge specific capacity curve of a sodium-carbon dioxide battery based on the high-concentration high-entropy electrolyte provided by an embodiment of the present disclosure and a traditional electrolyte.
Figure 7:
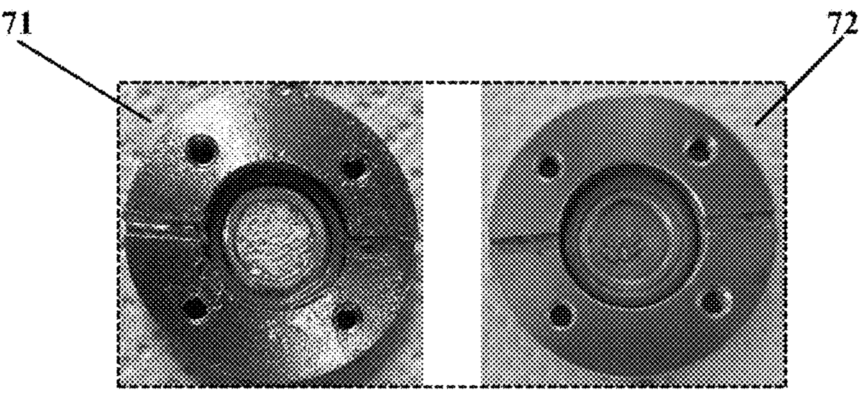
FIG. 7 is a photograph of a metal sodium anode of a battery based on a traditional electrolyte and the high-concentration high-entropy electrolyte after discharge.

The performance of the two sodium-carbon dioxide batteries assembled in this embodiment was tested under constant temperature of 30° C. and pure carbon dioxide conditions. The discharge specific capacity curve is shown in FIG. 6. When the cathode electrolyte is the high-concentration high-entropy electrolyte, the discharge specific capacity of the sodium-carbon dioxide battery is 44.85 $mAh/cm^2$; When the cathode electrolyte is the traditional electrolyte, the discharge specific capacity of the sodium-carbon dioxide battery is 10.67 $mAh/cm^2$. In addition, as shown in FIG. 7, 71 represents the metal sodium anode of a battery using the traditional electrolyte, 72 represents the metal sodium anode of a battery using the high-concentration high-entropy electrolyte. It can be seen that, when the cathode electrolyte is the traditional electrolyte, the residual amount of metallic sodium in the anode of the sodium-carbon dioxide battery is significantly lower than that when the cathode electrolyte is the high-concentration high-entropy electrolyte cathode, which significantly improves the utilization rate of metallic sodium in the anode. It can be seen that the performance of the sodium-carbon dioxide battery using the high-concentration high-entropy electrolyte as the cathode electrolyte in this embodiment is better than that of the sodium-carbon dioxide battery using the traditional electrolyte as the cathode electrolyte.

Embodiment 3

In this embodiment, two of sodium-carbon dioxide batteries are provided for comparative experiments. The two sodium-carbon dioxide batteries, from an anode section A to a cathode section C, sequentially include a metal sodium anode A1, an anode electrolyte A2, a solid electrolyte separator B, a cathode electrolyte C1, and a catalytic layer C2. Among them, the metal anode A1 is a metal sodium sheet, with a thickness of 1 mm and a diameter of 10 mm; The anode electrolyte A2 is 1 M $NaClO_4$/[(EC+DMC) (1:1)+1 vol % FEC]; The solid electrolyte diaphragm B is a NASICON type fast ion conductor, with a thickness of 1 mm and a diameter of 16 mm; The cathode electrolyte of one the two sodium-carbon dioxide batteries is a high-concentration high-entropy electrolyte, which is prepared by dissolving 5 solute salts including 23 M NaFSI, 3 M $NaClO_4$, 3 M NaCl, 3 M $NaNO_3$, and 3 M NaI in deionized water according to the above preparation method; The cathode electrolyte of another of the two sodium-carbon dioxide batteries is a traditional electrolyte, which is a saturated sodium chloride solution; The catalyst layer is pressed from carbon paper loaded with catalyst and foam nickel. The carbon paper loaded with catalyst is porous hydrophilic carbon paper with a diameter of 10 mm and a thickness of 0.5 mm. The catalyst is 5% Ru/C. The foam nickel has a thickness of 1 mm and a diameter of 10 mm.

Figure 8:
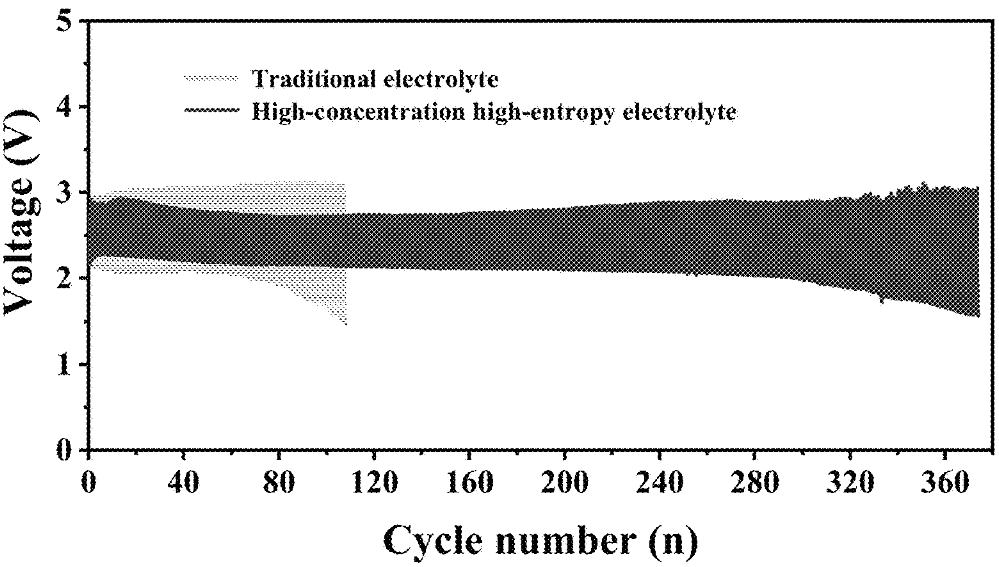
FIG. 8 is a cycle curve diagram of a sodium-carbon dioxide battery based on the high-concentration high-entropy electrolyte provided by an embodiment of the present disclosure and a traditional electrolyte disclosure.

The performance tests were conducted on the two sodium-carbon dioxide batteries assembled in this embodiment under constant temperature of 30° C. and pure carbon dioxide conditions. The cycle curves are shown in FIG. 8. When the cathode electrolyte is the high-concentration high-entropy electrolyte, the cycle times of the sodium-carbon dioxide battery are as high as 374 times; When the cathode electrolyte is the traditional electrolyte, the cycle times of the sodium-carbon dioxide battery can reach up to 108 times. It can be seen that the performance of the sodium-carbon dioxide battery using the high-concentration high-entropy electrolyte as the cathode electrolyte in this embodiment is better than that of the sodium-carbon dioxide battery using traditional electrolyte as the cathode electrolyte.

Embodiment 4

In this embodiment, two sodium-carbon dioxide batteries are provided for comparative experiments. The two sodium-carbon dioxide batteries, from an anode section A to a cathode section C, sequentially include a metal sodium anode A1, an anode electrolyte A2, a solid electrolyte separator B, a cathode electrolyte C1, and a catalytic layer C2. Among them, the metal anode A1 is a metal sodium sheet, with a thickness of 1 mm and a diameter of 10 mm; The anode electrolyte A2 is 1 M $NaClO_4$/[(EC+DMC) (1:1)+1 vol % FEC]; The solid electrolyte diaphragm B is a NASICON type fast ion conductor, with a thickness of 1 mm and a diameter of 16 mm; The cathode electrolyte of one of the two sodium-carbon dioxide batteries is a high-concentration high-entropy electrolyte, which is prepared by dissolving 5 solute salts including 20 M NaFSI, 4 M $NaClO_4$, 4 M NaCl, 4 M $NaNO_3$, and 3 M NaI in deionized water according to the above preparation method; The cathode electrolyte of another of the two sodium-carbon dioxide batteries is a traditional electrolyte, which is a saturated sodium perchlorate solution; The catalyst layer is pressed from carbon paper loaded with catalyst and foam nickel. The carbon paper loaded with catalyst is porous hydrophilic carbon paper with a diameter of 10 mm and a thickness of 0.5 mm. The catalyst is 5% Ru/C. The foam nickel has a thickness of 1 mm and a diameter of 10 mm.

Figure 9:
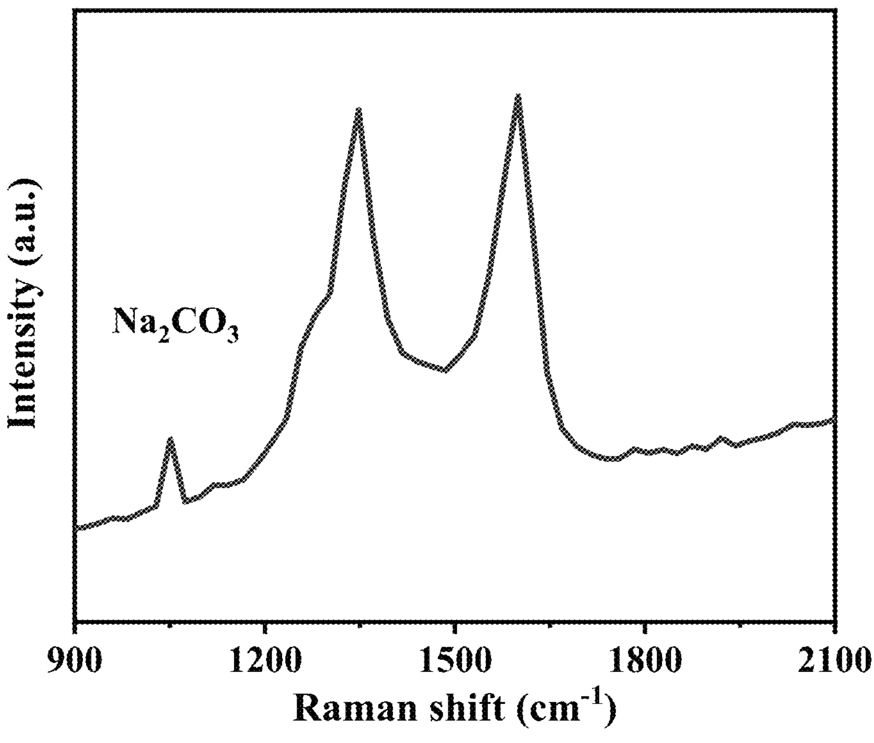
FIG. 9 is a Raman characterization diagram of a discharge product of a sodium-carbon dioxide battery based on a traditional electrolyte disclosure.
Figure 10:
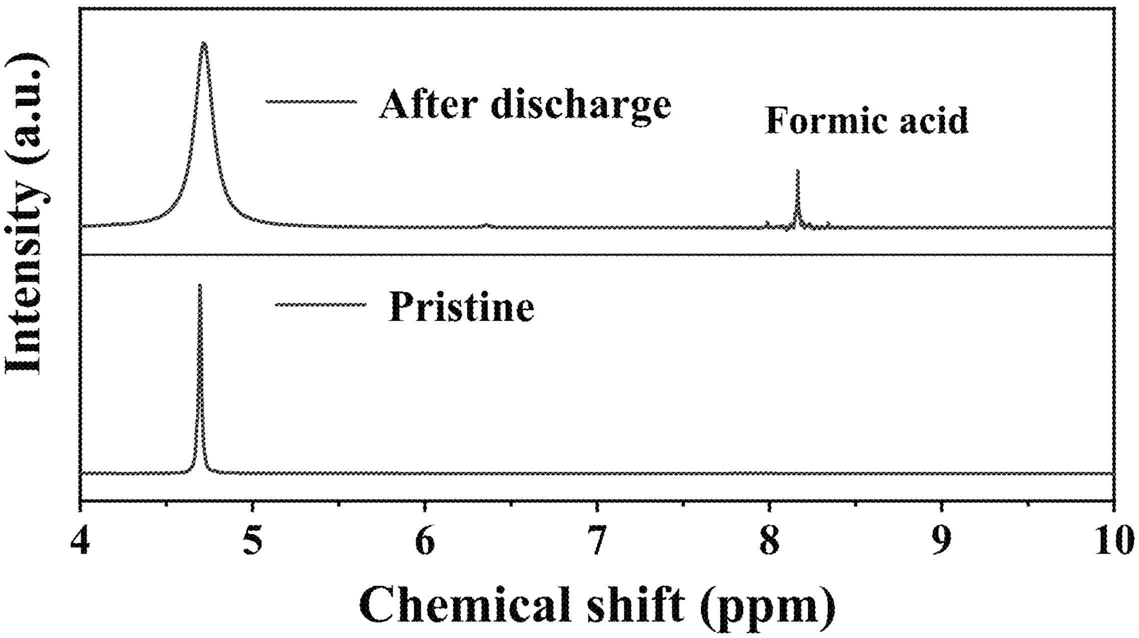
FIG. 10 is a nuclear magnetic resonance hydrogen spectrum of a sodium-carbon dioxide battery based on the high-concentration high-entropy electrolyte provided by an embodiment of the present disclosure.

The two sodium-carbon dioxide batteries assembled in this embodiment were subjected to complete discharge testing at a constant temperature of 30° C. and pure carbon dioxide conditions, as shown in FIG. 9. Raman spectroscopy was used to detect the catalytic layer after battery discharge, and it was found that when the cathode electrolyte was the traditional electrolyte, the discharge product of the battery was $Na_2CO_3$. As shown in FIG. 10, using nuclear magnetic resonance hydrogen spectroscopy to detect the electrolyte after battery discharge, it was found that when the cathode electrolyte is the high-concentration high-entropy electrolyte, the discharge product of the battery is liquid formic acid. It can be seen that in this embodiment, the discharge product of the sodium-carbon dioxide battery using the high-concentration high-entropy electrolyte as the cathode electrolyte is formic acid. As a liquid, it will not block the catalytic layer to cause battery failure, thereby ensuring the performance of the sodium-carbon dioxide battery using the high-concentration high-entropy electrolyte.

Although the present disclosure has been described above by combining exemplary embodiments, those skilled in the art should be aware that various modifications and changes can be made to the exemplary embodiments of the present disclosure without departing from the spirit and scope limited by the claims.

What is claimed is:

1. A high-concentration high-entropy electrolyte for a sodium-carbon dioxide battery, comprising a solvent, a first solute salt and added salts, wherein the first solute salt is a solute salt with high solubility in the solvent, while the added salts are composed of at least three solute salts, the molar concentration range of the solute salts in the high-concentration high-entropy electrolyte is between 35 M and 60 M, the molar concentration of the first solute salt is greater than 20 M, and the molar concentration of the first solute salt is greater than 50% of the molar concentration of the high-concentration high-entropy electrolyte;

wherein the first solute salt is Sodium bis(fluorosulfonyl) imide (NaFSI); the added salts are at least three of Sodium nitrate ($NaNO_3$), Sodium perchlorate ($NaClO_4$), sodium chloride (NaCl), and Sodium iodide (NaI); the solvent is water.

2. The high-concentration high-entropy electrolyte according to claim 1, wherein a sum of the molar concentrations of the added salts is less than 50% of the molar concentration of the high-concentration high-entropy electrolyte, and the proportion of the added salts is calculated based on the solubility of the solute salt in the solvent.

3. A sodium-carbon dioxide battery, comprising a metal sodium anode, an anode electrolyte, a solid electrolyte separator, a cathode electrolyte and a catalytic layer sequentially arranged, the metal sodium anode is a metal sodium sheet and the anode electrolyte is an ester electrolyte of 1 M $NaClO_4$/[(EC+DMC) (1:1)+1 vol % FEC], where 1:1 is the volume ratio; the solid electrolyte separator is a NASICON structured fast ion conductor of $Na_3Zr_2Si_2PO_{12}$; the cathode electrolyte is a high-concentration high-entropy electrolyte; the catalyst layer is obtained by pressing a carbon paper loaded with a catalyst and a foam nickel, and the catalyst is 5% Ru/C catalyst;

wherein the high-concentration high-entropy electrolyte comprises a solvent, a first solute salt and added salts, wherein the first solute salt is a solute salt with high solubility in the solvent, while the added salts are composed of at least three solute salts, the molar concentration range of the solute salts in the high-concentration high-entropy electrolyte is between 35 M and 60 M, the molar concentration of the first solute salt is greater than 20 M, and the molar concentration of the first solute salt is greater than 50% of the molar concentration of the high-concentration high-entropy electrolyte;

wherein the first solute salt is Sodium bis(fluorosulfonyl) imide (NaFSI); the added salts are at least three of Sodium nitrate ($NaNO_3$), Sodium perchlorate ($NaClO_4$), sodium chloride (NaCl), and Sodium iodide (NaI); the solvent is water.

4. The sodium-carbon dioxide battery according to claim 3, wherein a sum of the molar concentrations of the added salts is less than 50% of the molar concentration of the high-concentration high-entropy electrolyte, and the proportion of the added salts is calculated based on the solubility of the solute salt in the solvent.

* * * * *